United States Patent [19]

Knauff

[11] Patent Number: 4,465,949
[45] Date of Patent: Aug. 14, 1984

[54] ELECTROMECHANICAL FREQUENCY GENERATOR-MODULATOR KINETIC STORAGE DEVICE

[76] Inventor: Robert J. Knauff, P.O. Box 2270, West Hollywood, Calif. 90028

[21] Appl. No.: 525,058

[22] Filed: Aug. 22, 1983

[51] Int. Cl.³ ............................................. H02K 7/06
[52] U.S. Cl. ..................................... 310/81; 310/84; 310/51; 310/177; 446/409; 446/438; 446/462
[58] Field of Search ............... 310/51, 74, 177, 79, 310/81, 84; 46/45, 226, 229, 251, 111, 201, 207

[56] References Cited

U.S. PATENT DOCUMENTS

| | | | |
|---|---|---|---|
| 3,030,517 | 4/1962 | Gibbons | 310/74 X |
| 3,389,317 | 6/1968 | Prewitt | 310/74 X |
| 3,484,631 | 12/1969 | Dyer et al. | 310/81 X |
| 3,671,785 | 6/1972 | Fuchs et al. | 310/81 X |
| 3,783,312 | 1/1974 | Schindel et al. | 310/74 X |
| 3,819,966 | 6/1974 | Noguchi | 310/74 |

Primary Examiner—Mark O. Budd
Attorney, Agent, or Firm—William H. Maxwell

[57] ABSTRACT

An electromechanical device comprised of a battery energized motor having widely separated poles and requiring momentum for operation applied by inertia from a lost motion fly-weight accelerated by the motor during commutation which momentarily starts and stops the motor for an extended dwell time and which subsequently restarts the motor for continued operation, there being primary sensory effects as a result of motor operation subject to speed change by the control of extraneous motion, there being a first motor commutated circuit energizing sensory effects, and there being a second cam switched circuit energizing sensory effects adjusted to long and short dwell modes, the motor operation and effects being synchronous at variable angular velocity within 180° and 360° of rotation.

36 Claims, 11 Drawing Figures

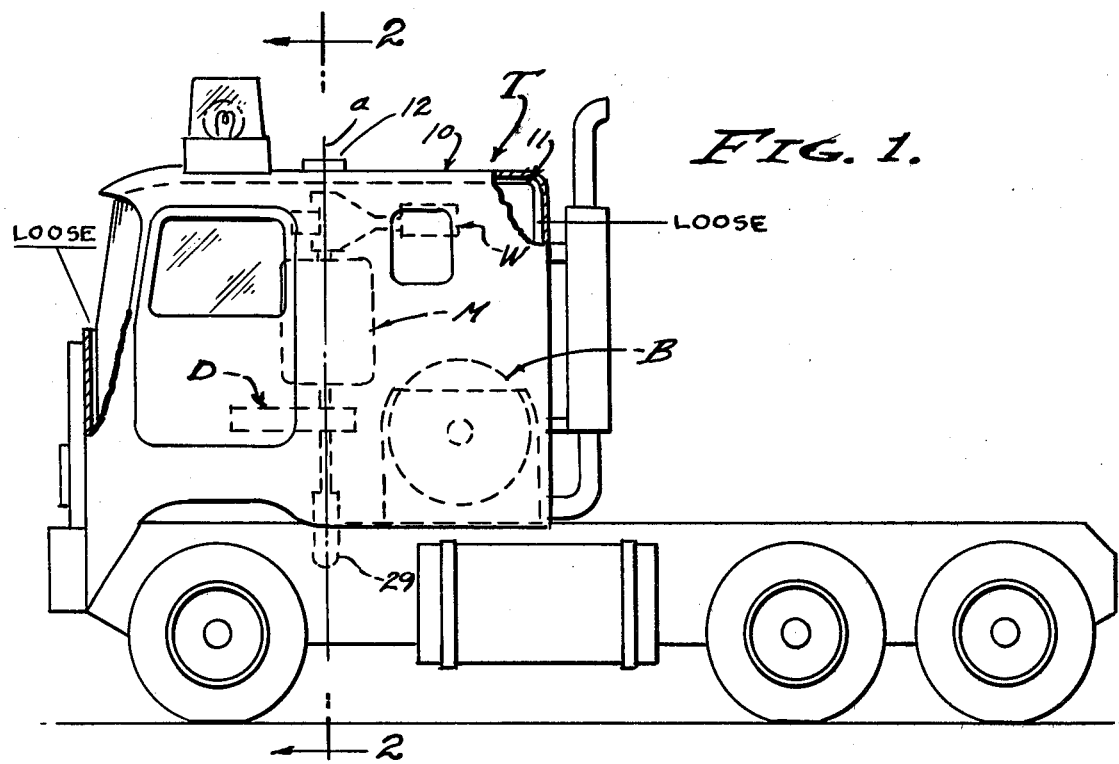
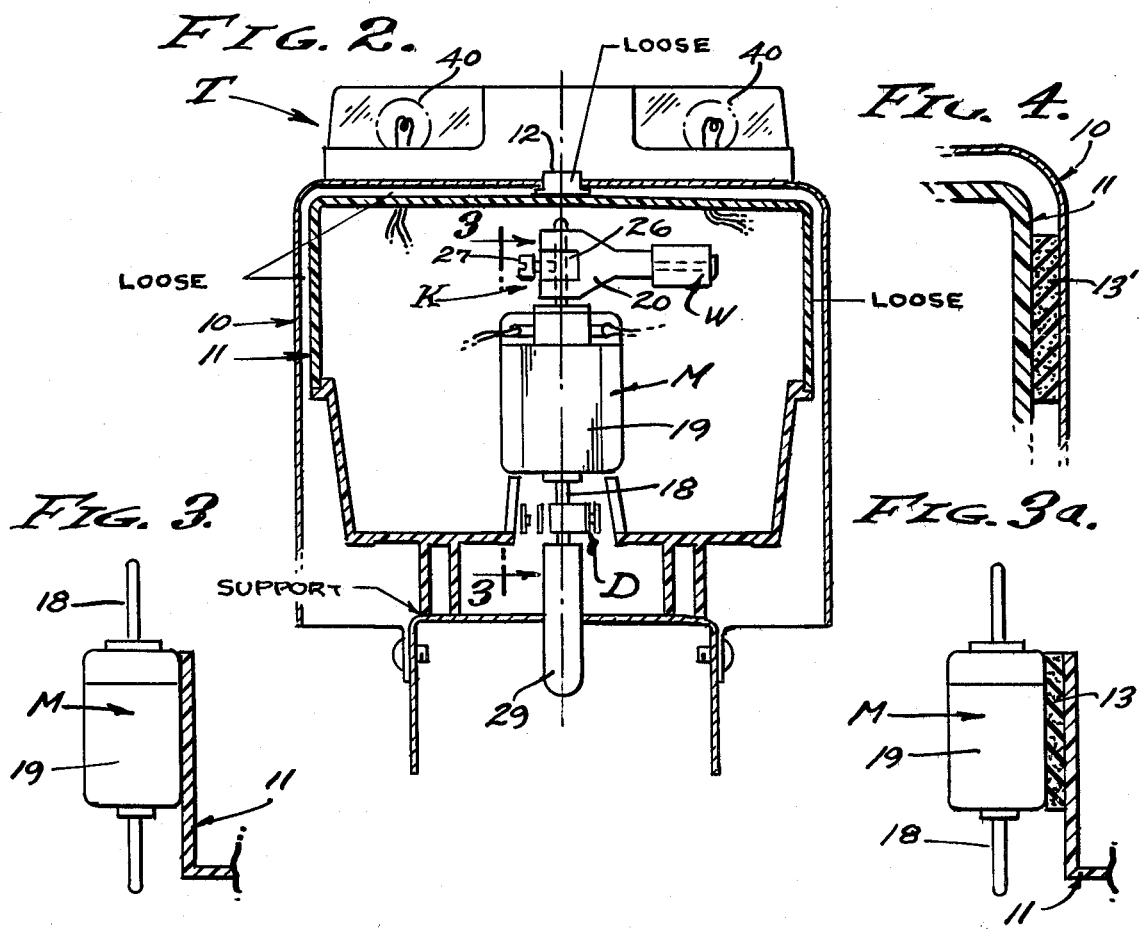

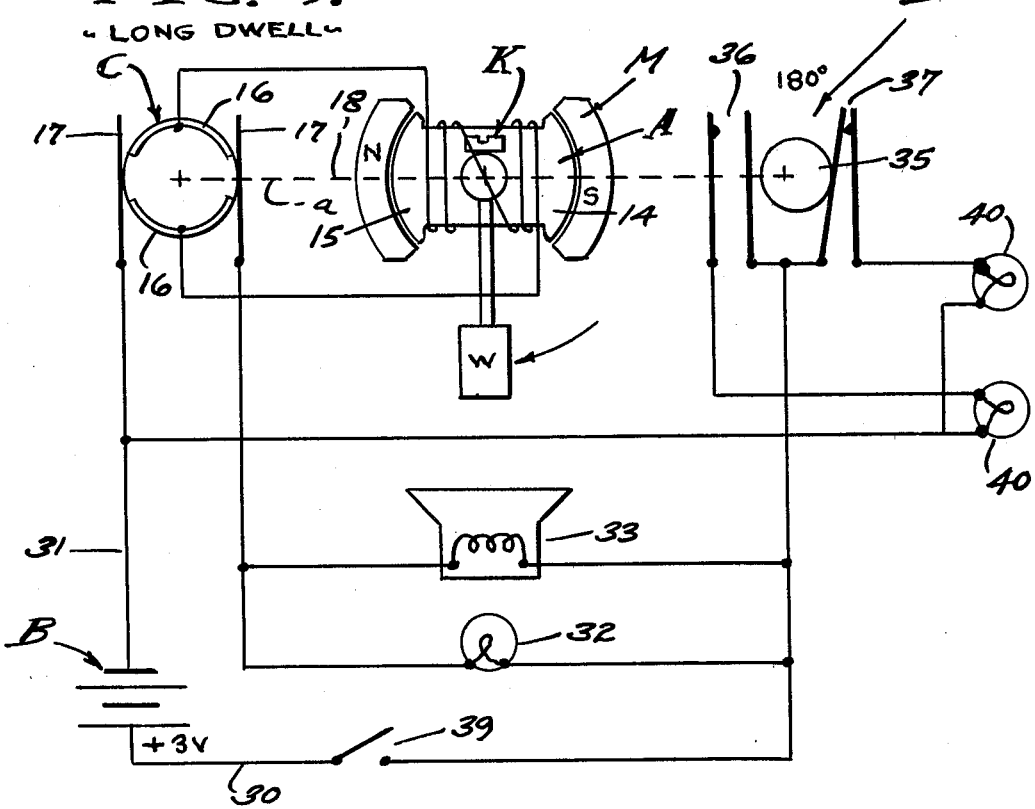
FIG. 9. "LONG DWELL"
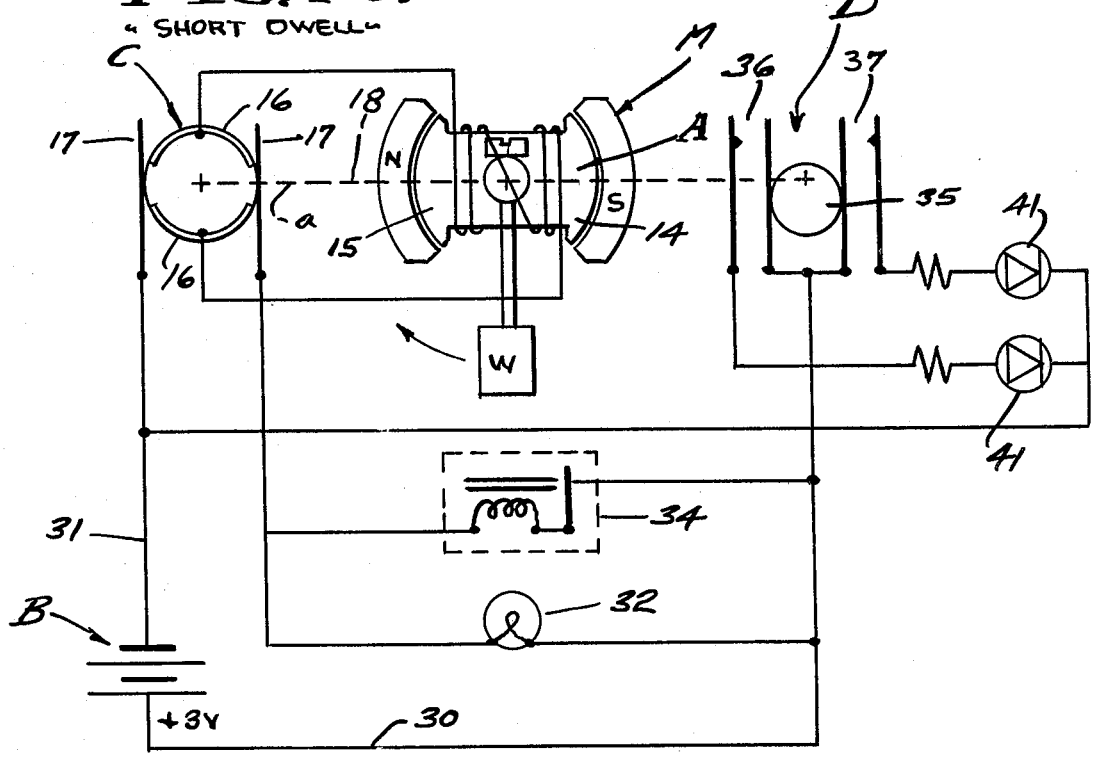
FIG. 10. "SHORT DWELL"

ELECTROMECHANICAL FREQUENCY GENERATOR-MODULATOR KINETIC STORAGE DEVICE

BACKGROUND

This invention relates to electromechanical toys and the like wherein one or more batteries is employed to energize and motivate the same. More particularly this invention is concerned with motorized toys wherein light sound and motion are desired for simulating realistic and fanciful effects, singly or together. It is a primary object here to provide a low cost product that is especially marketable in the toy, hobby and electromechanical fields, and such as to provide durable and interesting toys and hobby articles of varied configuration and design. Electrical motorization is involved herein, characterized by a two pole or like permanent magnet motor with commutation for its operation and control of light and sound effect means in circuit therewith and/or switched thereby, all synchronously. A characteristic feature is a flip-flop motor action achieved through the use of pole separation and inertia means that maintains a de-energized motor condition until momentum is established therein, and whereby the inertia means stores and reapplies energy to the motor during operation. A feature is the acceleration and deceleration of the motor as a result of alternately storing kinetic energy in and withdrawing kinetic energy from a fly-weight on the motor shaft by which it is started and caused to rotate.

This invention employs a modulating effect of rotary switching or shunting action in a first D.C. motor circuit through the commutator-brush assembly, in order to achieve and produce motion, sight and sound sensory effects. That is, primary effects are those resulting directly from motor commutation, and secondary effects are those resulting indirectly from motor rotation and switching. The effects are realized by energizing incandescent lamps, light emitting diodes, relays, motors, speakers, electromagnets, buzzers, and any like transducer etc. With this invention there are essentially two modulation circuits that cooperate to produce multi sight and sound effects, simultaneously with the motor rotation and which also may produce sight and sound and touch effects. A first motor circuit is turned on and off by motor commutation and is in series with one or more secondary effect producing means, and one or more second effect circuit is synchronously switched in timed relation to motor rotation in parallel with the said first motor circuit, to separately energize one or more secondary effect means. Accordingly, it is a general object of this invention to dependently relate the cooperative effect of sight, sound, motion and touch effects, utilizing a two pole D.C. motor or the like as a prime mover and modulator therefor.

It is an object of this invention to advantageously employ the intermittent commutation of a D.C. motor, and preferably a two pole motor having a substantial and distinct dwell time between the ON periods of commutation. Such motors are commercially available as prime movers for toys and the like, and require starting by means of establishing momentum in the armature. We are concerned here, for example, with a 1.5 volt battery operated motor having a two pole permanent magnet field, and having a two pole armature. When such a motor is de-energized, the poles of the field attract the poles of the armature, whereby they are centered or aligned in the dwell or OFF condition. Accordingly, such a motor by itself need not be switched ON and OFF from the battery. For example, the total commutated ON time for such motors is 200° of rotation, while the total OFF time is 160° of rotation. Since the OFF time dwell is substantial, momentum must be initiated in the armature before continued rotation will occur. With respect to rotation, it is an object of this invention to accelerate and to decelerate the motor armature and its commutation, whereby modulation thereby is caused to be accentuated and more distinct.

It is another object of this invention to modify the rate of angular momentum in a motor of the type refered to above, and to this end a load is applied to the motor shaft in the form of a lost-motion fly-weight that receives and stores kinetic energy during the motor ON time, that permits the motor shaft to intermittently decelerate, and that reapplies the stored energy to the motor shaft. In practice, the motor shaft and armature "flip" either 180° or 360° each time commutation is applied, dependent upon applied power and design factors, and during the ON time drives the fly-weight. At the end of the ON time the fly-weight continues to revolve at the rate of angular momentum imparted thereto, while the motor shaft and armature decelerate. In actual practice there is or can be a START and STOP action. The lost motion between the motor shaft and the fly-weight is by means of a hub and striker, whereby the striker alternately receives and reapplies kinetic energy from and into the said hub. As shown, the fly-weight is carried by the hub rotatable on the motor shaft, and the striker is driveably carried by said motor shaft to engage circumferentially spaced drive faces on the hub. In practice, the drive faces are spaced 225° to 340° apart for that arc of free travel or lost motion of the fly-weight.

It is still another object of this invention to rotatively coordinate the fly-weight and striker positions relative to the ON and OFF commutation, so that motor operation is continuous at varied rates of angular momentum. To this end the commutator bars are positioned normal to the armature poles controlled thereby, and the striker is positioned in alignment therewith. However, there are two basic operational dispositions of the motor shaft axis, namely horizontal and vertical; there being omni variations thereof when in actual use. In or toward the horizontal disposition of the motor axis, the fly-weight depends by gravity. But in a true vertical disposition of the motor axis the fly-weight is not affected by gravity. Consequently, flip-flop effect is more pronounced toward and in the horizontal disposition; and motor operation, smoothness and ease of starting is more pronounced in and toward the vertical disposition.

An object of this invention is the accentuated modulation provided by a first motor circuit in series with effect means such as lights, speakers and buzzers etc. Also an object of this invention is a second effects circuit or circuits, in parallel with the motor circuit with effect means such as lights, speakers, piezo sounders and light emitting diodes etc. As will be described, the switching means provided herein is selectively adjusted to long or short dwell modes, with adjustment predetermined for adapting to incandescent lamps and the like (long dwell) as distinguished from adapting to light emitting diodes and the like (short dwell).

Still further, it is an object to modify and accentuate the effects of sensory sight and sound, and touch, by loosely mounting the prime mover modulator and inertia means hereinabove referred to. With respect to mounting, for example in the body or framework of a toy or the like, a loose mounting with peripheral freedom of limited extent provides vibration and resonance or shaking together with resultant sound, which reduces the motor and fly-weight efficiency to slow its rate of angular momentum. Alternately, it is an object to remove said burden and to increase efficiency and smoothness of operation by selectively securing the prime mover and fly-weight axis, whereby speed and smoothness of operation is increased. A manual button is provided for this purpose, and which alters the functions of the primary as well as secondary effect means.

SUMMARY OF INVENTION

This invention relates to an electromechanical frequency generator for the modulation of sensory effect circuits, and appeals to perception by the senses of sight, sound and touch. A prime mover in the form of a battery operated D.C. motor with pole separation is employed in combination with a kinetic energy storage means that receives energy from the motor when it is commutated and that reapplies said energy to accelerate or restart the motor. A peculiarity of the particular two pole motor employed is that it requires momentum for its continued operation, and though such a motor will run continuously under light load, as heavier loads are applied inertia must be provided in order to carry over rotary movement from pole to pole. For these reasons, a two pole motor will maintain a de-energized position with its two armature poles aligned with its two field poles; a spring-like action. This invention takes advantage of the aforesaid motor characteristics by providing a fly-weight having lost motion on the motor shaft with a striker driven by the motor shaft to receive energy therefrom and alternately to reapply said energy thereto.

The purpose of this invention is to produce sight, sound and tactile and/or touch effects, referred to herein as sensory effects. The range or sound effects vary from Diesel truck or engine "nuts-and-bolts" sounds, motorcycle "putt-putt" sounds, to the "tick-tock" sounds of a clock, or any like sounds. Further, these sounds are colored or tuned as may be desired by mechanical or electrical means and/or amplification and resonance, as will be described. Increased longevity of the motor brush life and of the power supply, battery or cell, is a resultant feature of turning the motor circuit ON and OFF with increased dwell time, and all of which enhances the flip-flop effect. And, in combination with the first circuit motor commutation there is provided a second circuit effect means switching that can be set for long dwell or short dwell as circumstances require; the former being applicable to sensory effect means requiring resistance or inductance time; and the latter being applicable to instantaneously operable secondary effect means. The physical embodiment of this invention is low cost and its functions are inherent and reliable, as will now be described.

The foregoing and various other objects and features of this invention will be apparent and fully understood from the following detailed description of the typical preferred forms and applications thereof, throughout which description reference is made to the accompanying drawings:

FIG. 1 is a side elevation of a typical toy embodying the present invention.

FIG. 2 is an enlarged transverse sectional view taken as indicated by line 2—2 on FIG. 1.

FIG. 3 is a fragmentary sectional view taken as indicated by line 3—3 on FIG. 2, showing a fixed mounting of the motor.

FIG. 3a is a view similar to FIG. 3 showing a padded mounting of the motor.

FIG. 4 is an enlarged fragmentary sectional view showing a padded installation of the shells of the cab of the truck shown in FIGS. 1 and 2.

FIG. 9 is an electrical diagram of the motor and kinetic energy device with circuit control means for long dwell.

Figure 5:
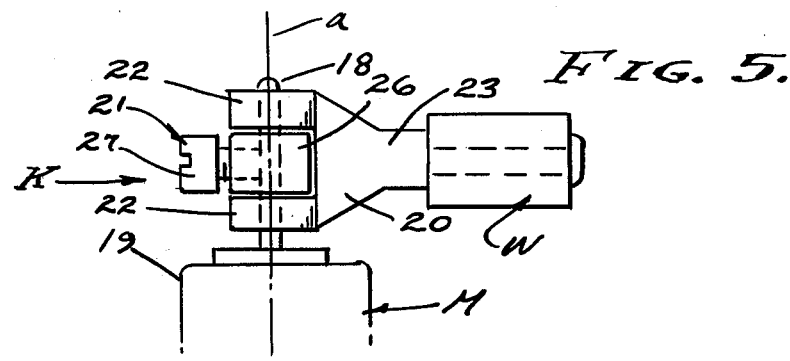
FIG. 5 is an enlarged detailed side view of the motor and kinetic fly-weight that characterizes the present invention.
Figure 6:
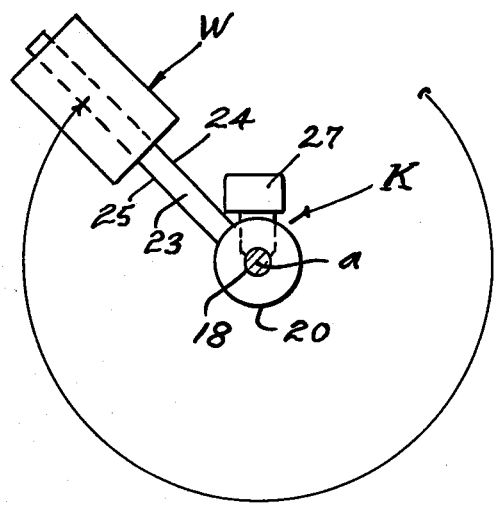
FIGS. 6 and 7 are plan views of the kinetic fly-weight shown in FIG. 5, FIG. 6 showing the inertia start and restart condition as related to a stricker, and FIG. 7 showing the motor and striker drive condition thereof.
Figure 7:
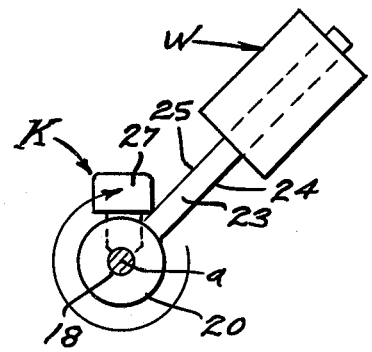
Figure 8:
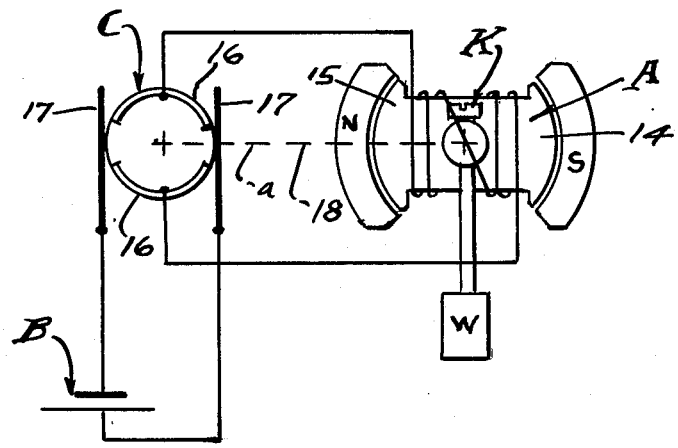
FIG. 8 is an electrical diagram of the basic motor and kinetic energy device.

And, FIG. 10 is an electrical diagram of the motor and kinetic energy device with circuit control means for short dwell.

PREFERRED EMBODIMENT

Referring now to the drawings, the frequency generator-modulator of the present invention is cooperatively combined with a toy article shown as a truck T, wherein the cab structure involves at least two loosely related members and preferably outer and inner shells 10 and 11 with substantial looseness therebetween. In accordance with this invention this looseness is limited so as to control sound as the result of rattling, by means of the eccentric motion of a fly-weight W accelerated and decelerated by operation of a motor M, creating sight and tactile and/or touch effects (shaking) and sound effects, primary effects as a result of motor operation. The motor axis a is rigid with the inner shell 11 so as to impart its off-balance inertia thereto during rotation, there being a limited predetermined clearance at one and preferably at all sides of the inner shell 11 and outer shell 10, except that said inner shell is free to rest at one side upon the outer shell; the bottoms engage for support of the inner shell as shown.

The motor axis a is preferably vertical so that gravity has little or no affect on a kinetic alternator means K, and whereby fore and aft and/or circular manipulation of the truck can be used to cause starting of the motor M. However, it is to be understood that the axis a can be horizontal if so desired. At one side wall and preferably in the top of the outer cab shell 10 there is a loose depressible manually operable button 12 engageable with the inner shell 11, and by which the two shells can be made immoveable relative to each other, thereby eliminating looseness and removing the burden of extraneous motion from the motor M and revolving fly-weight later described. Broadly considered, the inertia weight W can be a circular fly-wheel which is balanced. In practice, the motor M can be mounted on soft depressible pads 13; also, the space between the cab shells 10 and 11 can be occupied by soft depressible padding or pads 13' so as to modify the rattling effect, by cushioning the same. It is to be understood that the motor M, kinetic alternator means K, and the parts and elements connected therewith as will be described, can all be housed as they are described in any body portion or the like of a toy or such article, as circumstances require.

The motor M is a direct current prime mover having widely separated field poles, and preferably a pair of diametrically opposite field poles N and S, and having a rotatable armature A with a pair of diametrically opposite poles 14 and 15. Motor M is a two pole D.C. motor with commutation for reversing polarity of the armature A, so that it will rotate within the field poles N and S when momentum is imparted thereto. Accordingly, the motor M has a commutator C with diametrically opposite bars 16 and each extending (effectively) 100° as shown, the two remaining 80° segments of the commutator being of a dielectric non-conductive material. And, the motor M has a pair of diametrically opposite brushes 17 contacting the commutator in alignment with the field poles N and S. This is a typical two pole motor having commutation periods of 100° separated by intermediate dwell periods of 80°, it being understood that these arcuate degrees of commutation and dwell can vary in different motors and their application to this invention. A motor shaft 18 extends from opposite ends of case 19 to carry the kinetic alternator means K and a second modulator circuit means D. The commutating circuit of motor M is a first modulator circuit, said first and second modulating circuits being employed to control varied sensory effect means as later described. A basic motor M draws 750 to 3000 milliamps and is energized by a single 1.5 Volt Alkeline cell or battery B.

The kinetic alternator means K receives motor torque applied during the ON periods of motor operation, and reapplies torque to the motor which decelerated as a result of applying said torque to said means K. In accordance with this invention, the kinetic alternator means K involves a hub 20 rotatable on motor shaft 18, a striker 21 fixed to the motor shaft 18, and the inertia fly-weight W. The hub 20 is a clevis shaped member having axially spaced bearings 22 freely rotatable on shaft 18, and it is characterized by a radial arm 23 that carries the inertia fly-weight W, for example an approximately two gram weight with its center of gravity at about ⅞ inch from the axis of rotation. In practice, the arm 23 is a flat member that joins the bearings 22 and which presents opposite circumferentially disposed front and back faces 24 and 25 to be alternately engaged by the striker 21. As shown, the striker 21 involves a collar 26 and setscrew 27 embraced by the bearings 22, the setscrew 27 being tightened onto motor shaft 18. The bearings 22 have end play or clearance from the collar 26, and the setscrew 27 has a striker head that is alternately engageable with the faces 24 and 25 of the arm 23. In carrying out this invention, the striker head is positioned and set normal to the armature poles 14 and 15 and in alignment with the opposite commutator bars 16 and brushes 17. In practice, the setscrew 27 has a fillister type striker head of a diameter and at a radius of contact with faces 24 and 25 to permit 275° to 340° freedom of the hub 20 and its arm 23 carrying the inertia fly-weight W, as shown. A manually engageable start knob 29 is provided for turning the motor shaft 18.

Operation of the above described motor M and kinetic alternator means K is as follows: With the motor M electrically energized and in a non rotating condition with its field poles and armature poles aligned, the toy truck T is shifted bodily in order to swing the fly-weight W, or the knob 29 is spun manually, and either of which imparts momentum to the fly-weight W. Sufficient momentum imparted to said fly-weight W causes the front face 24 of arm 23 to be forceably engaged the striker head and thereby impart rotary movement to the armature-commutator bars 16 to contact with the brushes 17. As a result of this start function, the motor M is activated and quickly accelerates in the direction of its rotation (clockwise as shown) since very little inertia is involved in the shaft 18 and striker 21. Since the fly-weight W transfers its kinetic energy into the striker 21 and motor armature A, the angular momentum of the fly-weight has decreased to substantially less than the angular momentum of the motor armature A and striker 21. Consequently, the striker 21 then revolves into forceful engagement with the back face 25 of arm 23 and thereby transfers motor torque and armature inertia into the fly-weight W as kinetic energy. This transfer of energy results in deceleration of the motor armature A and of the striker 21 which are essentially stopped; that is, the motor M is stalled with its field poles and armature poles substantially aligned. However, the transferred energy is present as sufficient momentum in the fly-weight W to cause restarting of the motor M when the front face 24 again forcefully engages the striker head. The foregoing cycle is operable to flip the motor armature A either 180° or 360° and is automatically repeated until the fly-weight W is stopped and/or the motor M de-energized. Note that the angular momentum of both the fly-weight W and motor shaft 18 vary during each cycle of rotation, with an extended dwell through or in the pole alignment position of commutation. In actual practice, the fly-weight W accelerates and decelerates and stops, while the motor armature A stops in and is restarted from the dwell position; thereby lengthening the dwell time and shortening the ON time due to rapid acceleration.

The first modulator circuit involves motor commutation and its ON-OFF effect characterized by the substantial dwell of 80° at 100° intervals, for example. The motor M circuit is through the brushes 17 from opposite poles of battery B, shown in FIGS. 9 and 10 as multi cells for higher voltage in order to also power a multiplicity of sensory effect means. As shown, there is a positive lead 30 and a negative lead 31, in either of which there is one or more sensory effect means in series with this first modulator circuit. The sensory means are preferably in series in the positive lead 30, and in the form of an incandescent lamp 32, or a loudspeaker 33, or a buzzer 34, or the like, and any combination thereof; for example a lamp 32 and loudspeaker 33 in parallel (FIG. 9) or a lamp 32 and buzzer 34 in parallel (FIG. 10).

The second modulator circuit switching means D involves the accelerated and decelerated rotation of motor M and its shaft 18. Acceleration occurs during the ON time when commutation is made, while deceleration occurs during the dwell or OFF time, and in accordance with this invention these accelerations and decelerations are advantageously applied to timed switching through varied angular momentum transmitted by shaft 18. As shown in FIG. 9 there is at least one switch operated by a cam 35 revolved by motor shaft 18, and preferably a pair of diametrically opposite switches 36 and 37 in parallel with the first modulator circuit hereinabove described. Accordingly, the first and second modulator circuits are isolated to the extent that closure of one circuit is distinct from the other, the cam 35 being selectively positioned on shaft 18 for either long dwell (FIG. 9) or for short dwell (FIG. 10).

Referring now to FIG. 9 of the drawings and the long dwell mode of the second modulator circuit means D, the cam 35 is rotatively aligned with the motor M armature poles 14 and 15 so as to close either switch 36 or 37 in the dwell condition or transition period between armature energization and deceleration thereof. Consequently, at each 180° position of rotation a switch 36 or 37 is held closed for a lengthy duration adapted to energize incandescent lamps 40 and the like. In practice, the switches 36 and 37 are leaf switches and the cam 35 is a simple eccentric. In the long dwell adjustment of cam 35, the entire circuitry is turned OFF by means of a main switch 39.

Referring now to FIG. 10 of the drawings and to the short dwell mode of the second modulator circuit means D', the eccentric cam 35 is aligned with the commutator bars 16 of motor M so as to close either switch 36 or 37 in the accelerating condition of the motor M. Consequently at each 180° position of rotation a switch 36 or 37 momentarily closes for a short duration adapted to pulse energize Light Emitting Diodes 41 or the like. The leaf switch 36 and 37 closure duration can be shortened by cam design and by closeness of the actuated switch leaf to the cam, all as circumstances require. In the short dwell adjustment of cam 35, the circuitry is automatically turned OFF by the inherent dwell condition when the motor M is stalled, so that the main switch 39 can be eliminated.

From the foregoing it will be seen that motor M operation is intermittent and continued by means of the alternator means K. In practice, the motor decelerates to a stop within the dwell positions of non-commutation, a characteristic feature of motor M being the separation of its poles and inherent alignment thereof until momentum is applied to armature A through its shaft 18. Accordingly, commutation timing generates distinct ON and OFF periods in the first modulator circuit, accentuated by the dwell time during deceleration and momentary stopping of armature A. Simultaneous with said first circuit modulation, cam controlled switching in the second modulator circuit is responsive to the variations in angular momentum of armature A and shaft 18, and which is adjustable for either a long or a short dwell as may be desired. In order to establish the long dwell mode in the second modulator circuit means D, the high spot of cam 35 is positioned to close either switch 36 or 37 in the OFF dwell position as shown in FIG. 9. In order to establish the short dwell mode in the second modulator circuit means D', the high spot of cam 35 is positioned to close either switch 36 or 37 in the ON commutating position as shown in FIG. 10.

The sensory means in the form of lights and sound or motion transducers, as hereinabove described, are applied in the primary series circuit with the battery B commutated by motor M, and in parallel with battery B switched by modulator circuits D or D'. Variations in angular momentum, deceleration and acceleration, are obtained by disposition and/or movement of the axis a; with uniformity of operation when disposed vertically, since gravitational force is equalized with respect to motion of the fly-weight W; and with variations and/or stoppage of operation when disposed toward or in the horizontal, since gravitational force is applied to fly-weight W as a pendulum. Angular momentum, in general, is controlled by the button 12, which when loose permits extraneous motion causing inefficiency and a slowing in motor M operation, and which when tightened manually, or otherwise, eliminates extraneous motion so as to establish efficiency in motor M operation. That is, the button 12 controls the application of kinetic energy by permitting or eliminating waste thereof in the form of said extraneous motion.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. A frequency generator-modulator and kinetic device for sensory effects as a result of speed changes, and including;
   a direct current motor having widely separated field poles and armature poles attracted thereto for alignment therewith in a dwell position, and having widely spaced commutator bars in contact with brushes in a battery circuit when rotated from a dwell position to accelerate the motor armature,
   and a kinetic alternator means for receiving energy as a result of motor armature acceleration and momentarily decelerating the motor armature in a dwell position, and for storing said energy with the motor armature in said dwell position, and for reapplying said energy to and restarting the motor armature from said dwell position,
   whereby momentum applied to the kinetic alternator means during commutation momentarily accelerates the same and decelerates the motor armature and subsequently restarts the motor armature for continued operation of the motor at varied angular velocity.

2. The frequency generator-modulator as set forth in claim 1, wherein the direct current motor is a two pole motor having diametrically opposite field poles and diametrically opposite armature poles attracted one to the other each through 180° of rotation.

3. The frequency generator-modulator as set forth in claim 1, wherein the direct current motor is a two pole motor having diametrically opposite commutator bars extending through substantially 100° of rotation with diametrically opposite dwell separation extending through 80° of rotation.

4. The frequency generator-modulator as set forth in claim 1, wherein the direct current motor is a two pole motor having diametrically opposite field poles and diametrically opposite armature poles attracted one to the other each through 180° of rotation, and having diametrically opposite commutator bars extending through substantially 100° of rotation with diametrically opposite dwell separation extending through 80° of rotation.

5. The frequency generator-modulator as set forth in claim 1, wherein the kinetic alternator means comprises a hub rotatable on a shaft driven by the motor armature, an inertia fly-weight carried by the hub, and a striker carried by the shaft and engageable with circumferentially spaced front and back faces on the hub for restricted lost motion of the fly-weight with respect to the striker.

6. The frequency generator-modulator as set forth in claim 5, wherein the hub of the kinetic alternator means is comprised of a clevis shaped member having axially spaced bearings freely rotatable on the shaft and carrying a radial arm that presents said front and back faces and to which the fly-weight is attached.

7. The frequency generator-modulator as set forth in claim 5, wherein the hub of the kinetic alternator means is comprised of a clevis shaped member having axially spaced bearings freely rotatable on the shaft and carrying a radial arm that presents said front and back faces and to which the fly-weight is attached, and wherein the striker is carried on the shaft by a collar operable between and positioning the spaced bearings.

8. The frequency generator-modulator as set forth in claim 5, wherein the hub of the kinetic alternator means is comprised of a clevis shaped member having axially spaced bearings freely rotatable on the shaft and carrying a radial arm that presents said front and back faces and to which the fly-weight is attached, and wherein the striker is a set screw carried on the shaft by a collar positioned thereby and operable between and positioning the spaced bearings.

9. The frequency generator-modulator as set forth in claim 1, wherein the kinetic alternator means comprises a hub rotatable on a shaft driven by the motor armature, an inertia fly-weight carried by the hub, and a striker carried by the shaft and engageable with circumferentially spaced front and back faces on the hub for restricted lost motion in the range of 275° to 340° of the fly-weight with respect to the striker.

10. The frequency generator-modulator as set forth in claim 1, wherein the direct current motor is a two pole motor having diametrically opposite field poles and diametrically opposite armature poles attracted one to the other through 180° of rotation, and having diametrically opposite commutator bars extending through substantially 100° of rotation with diametrically opposite dwell separation extending through 80° of rotation, and wherein the kinetic alternator means comprises a hub with a clevis member having spaced bearings freely rotatable on a shaft driven by the motor armature and carrying a radial arm that presents circumferentially spaced front and back faces and to which an inertia fly-weight is attached, and a striker in the form of a set screw carried on the shaft by a collar positioned thereby and operable between and positioning the spaced bearings and for restricted lost motion between said front and back faces in the range of 275° to 340° of the fly-weight with respect to the striker.

11. The frequency generator-modulator as set forth in claim 1, wherein the direct current motor with widely separated field poles and armature poles attracted thereto is mounted on a soft depressible pad that permits extraneous motion.

12. A frequency generator-modulator and kinetic device for sensory effects in a toy body and the like as a result of speed changes and extraneous motion, and including;
at least two loosely related body members and to one of which is mounted a direct current motor having widely separated field poles and armature poles attracted thereto for alignment therewith in a dwell position, and having widely spaced commutator bars in contact with brushes in a battery circuit when rotated from the dwell position to accelerate the motor armature,
and a kinetic alternator means for receiving energy as a result of motor armature acceleration and momentarily decelerating the motor armature in a dwell position, and for storing said energy with the motor armature in said dwell position, and for reapplying said energy to and restarting the motor armature from said dwell position,
whereby momentum applied to the kinetic alternator means during commutation momentarily accelerates the same and decelerates the motor armature and subsequently restarts the motor armature for continued operation of the motor at varied angular velocity and torque applying extraneous motion between the loosely related body members so as to rattle the same one against the other.

13. The frequency generator-modulator in a body as set forth in claim 12, wherein the at least two loosely related body members are inner and outer shells, the inner shell housing the motor and kinetic alternator means.

14. The frequency generator-modulator in a body as set forth in claim 12, wherein the at least two loosely related body members are inner and outer shells, the inner shell housing the motor and kinetic alternator means on a horizontal axis of rotation.

15. The frequency generator-modulator in a body as set forth in claim 12, wherein the at least two loosely related body members are inner and outer shells, the inner shell housing the motor and kinetic alternator means on a vertical axis of rotation.

16. The frequency generator-modulator in a body as set forth in claim 12, wherein the kinetic alternator means includes a shaft driven by the motor armature and carries a manually engageable knob accessible for starting and stopping the motor.

17. The frequency generator-modulator in a body as set forth in claim 12, wherein the kinetic alternator means comprises a hub rotatable on a shaft driven by the motor armature, an inertia fly-weight carried by the hub, and a striker carried by the shaft and engageable with circumferentially spaced front and back faces on the hub for restricted lost motion of the fly-weight with respect to the striker, and wherein the shaft carries a manually engageable knob at the exterior of the body for starting and stopping the motor.

18. The frequency generator-modulator in a body as set forth in claim 12, wherein the at least two loosely related body members are inner and outer shells, the inner shell housing the motor and kinetic alternator means, and wherein a manually engageable button is depressible to force one shell toward and into engagement with the other so as to reduce and eliminate extraneous motion between the shells and motor mounting thereby reducing the rattle effect and increasing angular velocity of the motor.

19. The frequency generator-modulator in a body as set forth in claim 12, wherein the at least two loosely related body members are depressibly separated by a soft pad that supresses extraneous motion for reducing rattle and increasing angular velocity of the motor.

20. The frequency generator-modulator in a body as set forth in claim 18, wherein the at least two loosely related body member shells are depressibly separated by a soft padding that supresses extraneous motion for reduced rattle and increased angular velocity of the motor.

21. A frequency generator-modulator and kinetic device for sensory effects in circuitry controlled as a result of speed changes, and including;
a direct current motor having widely separated field poles and armature poles attracted thereto for alignment therewith in a dwell position and having widely spaced commutator bars in contact with brushes in a battery circuit when rotated from a dwell position to accelerate the motor armature, a kinetic alternator means for receiving energy as a result of motor armature acceleration and momentarily decelerating the motor armature in a dwell position, and for storing said energy with the motor armature in said dwell position, and for reapplying said energy to and restarting the motor armature from said dwell position, whereby momentum applied to the kinetic alternator means during commutation momentarily accelerates the same and decelerates the motor armature and subsequently restarts the motor armature for continued operation of the motor at varied angular velocity, and a modulator battery circuit comprising at least one sensory effect means turned ON and OFF synchronously with the varied angular velocity of the motor armature.

22. The frequency generator-modulator for circuitry control as set forth in claim 21, wherein the modulator battery circuit is in series with the first mentioned battery circuit through the commutator bars and motor armature, whereby the sensory effect means turns ON during commutation and turns OFF during dwell synchronously with the varied angular velocity of motor operation.

23. The frequency generator-modulator for circuitry control as set forth in claim 21, wherein the at least one sensory effect means is a light emitting lamp turned ON and OFF synchronously with the varied angular velocity of the motor operation.

24. The frequency generator-modulator for circuitry control as set forth in claim 21, wherein the at least one sensory effect means is a sound emitting speaker turned ON and OFF synchronously with the varied angular velocity of the motor operation.

25. The frequency generator-modulator for circuitry control as set forth in claim 21, wherein the at least one sensory effect means is a sound emitting buzzer turned ON and OFF synchronously with the varied angular velocity of the motor operation.

26. The frequency generator-modulator for circuitry control as set forth in claim 21, wherein the modulator battery circuit is in parallel with the first mentioned battery circuit through the commutator bars and motor armature, and wherein the sensory effect means is a light emitting lamp turned ON during commutation and turned OFF during dwell synchronously with the varied angular velocity of motor operation.

27. The frequency generator-modulator for circuitry control as set forth in claim 21, wherein the modulator battery circuit is in series with the first mentioned battery circuit through the commutator bars and motor armature, and wherein the sensory effect means is a sound emitting speaker turned ON during commutation and turned OFF during dwell synchronously with the varied angular velocity of motor operation.

28. The frequency generator-modulator for circuitry control as set forth in claim 21, wherein the modulator battery circuit is in series with the first mentioned battery circuit through the commutator bars and motor armature, and wherein the sensory effect means is a sound emitting buzzer turned ON during commutation and turned OFF during dwell synchronously with the varied angular velocity of motor operation.

29. The frequency generator-modulator for circuitry control as set forth in claim 21, wherein the modulator battery circuit is in parallel with the first mentioned battery circuit through the commutator bars and motor armature, and wherein an armature shaft rotates a cam engageable with switching means in the modulator battery circuit and turning the at least one sensory effect means ON and OFF synchronously with the varied angular velocity of the motor operation.

30. The frequency generator-modulator for circuitry control as set forth in claim 29, wherein the cam is positioned on the shaft with a high spot aligned with the dwell position of the motor armature and engageably depresses the switch means to an ON position for a long dwell time period.

31. The frequency generator-modulator for circuitry control as set forth in claim 29, wherein the sensory effect means is an incandescent lamp and wherein the cam is positioned on the shaft with a high spot aligned with the dwell position of the motor armature and engageably depresses the switch means to an ON position for a long dwell time period.

32. The frequency generator-modulator for circuitry control as set forth in claim 29, wherein the cam is positioned on the shaft with a high spot aligned with the commutator bars of the motor and energizing the sensory effect means to an ON condition for a short dwell time period.

33. The frequency generator-modulator for circuitry control as set forth in claim 29, wherein the sensory effect means is a Light Emitting Diode and wherein the cam is positioned on the shaft with a high spot aligned with the commutator bars of the motor and energizing the Light Emitting Diodes of the sensory effect means for a short dwell time period.

34. The frequency generator-modulator for circuitry control as set forth in claim 21, wherein a first modulator battery circuit is in series with the first mentioned battery circuit through the commutator bars and motor armature and with at least one sensory effect means turned ON thereby during commutation and turned OFF thereby during dwell of the motor operation, and wherein a second modulator circuit is in parallel with the first mentioned battery circuit through the commutator bars and motor armature, and wherein an armature shaft rotates a cam engageable with switching means in the second modulator battery circuit and turning at least one sensory effect means ON and OFF synchronously with the varied angular velocity of the motor operation.

35. The frequency generator-modulator for circuitry control as set forth in claim 34, wherein the cam is positioned on the shaft with a high spot aligned with the dwell position of the motor armature and engageably depresses the switch means to an ON position for a long dwell time period.

36. The frequency generator-modulator for circuitry control as set forth in claim 34, wherein the cam is positioned on the shaft with a high spot aligned with the commutator bars of the motor and energizing the sensory effect means to an ON condition for a short dwell time period.

* * * * *